United States Patent
Klink et al.

(10) Patent No.: US 11,473,203 B2
(45) Date of Patent: Oct. 18, 2022

(54) METHOD AND DEVICE FOR PROVIDING AT LEAST ONE PRODUCT STREAM BY ELECTROLYSIS AND USE

(71) Applicant: THYSSENKRUPP UHDE CHLORINE ENGINEERS GMBH, Dortmund (DE)

(72) Inventors: Stefan Klink, Bochum (DE); Gregor Damian Polcyn, Dortmund (DE); Florian Baumgard, Dortmund (DE); Jörg Pausch, Schwerte (DE); Klaus Dahlhues, Waltrop (DE); Dominik Bergs, Bochum (DE)

(73) Assignee: THYSSENKRUPP UHDE CHLORINE ENGINEERS GMBH, Dortmund (DE)

( * ) Notice: Subject to any disclaimer, the term of this patent is extended or adjusted under 35 U.S.C. 154(b) by 0 days.

(21) Appl. No.: 17/056,873

(22) PCT Filed: May 28, 2019

(86) PCT No.: PCT/EP2019/063722
§ 371 (c)(1),
(2) Date: Nov. 19, 2020

(87) PCT Pub. No.: WO2019/229019
PCT Pub. Date: Dec. 5, 2019

(65) Prior Publication Data
US 2021/0156036 A1 May 27, 2021

(30) Foreign Application Priority Data
May 30, 2018 (DE) ..................... 10 2018 208 624.9

(51) Int. Cl.
C25B 1/04 (2021.01)
C25B 9/73 (2021.01)
C25B 15/08 (2006.01)

(52) U.S. Cl.
CPC .................. *C25B 1/04* (2013.01); *C25B 9/73* (2021.01); *C25B 15/08* (2013.01)

(58) Field of Classification Search
CPC ......... C25B 15/087; C25B 15/08; C25B 9/05; C25B 9/70; C25B 9/00; C25B 9/73; C25B 1/04
See application file for complete search history.

(56) References Cited

U.S. PATENT DOCUMENTS 1,990,881 A * 2/1935 Rohlin ............... B01D 19/0063
137/503
6,338,786 B1 1/2002 Thorpe
(Continued)

FOREIGN PATENT DOCUMENTS

EP 2 905 359 A 8/2015
JP 2012117140 A 6/2012
(Continued)

OTHER PUBLICATIONS

English Translation of International Search Report issued in PCT/EP2019/063722, dated Feb. 3, 2020.

*Primary Examiner* — Nicholas A Smith
(74) *Attorney, Agent, or Firm* — thyssenkrupp North America, LLC

(57) ABSTRACT

Methods for providing at least one product stream, in particular hydrogen, by electrolysis by means of an electrolyzer having a multiplicity of electrolysis cells combined to form at least one framework; wherein electrolyte is discharged from the cells and separated into two phases. The electrolyte is collected upstream of a pump system. At least the functions of discharge and collection are carried out (Continued)

integrally together in a multifunctional collection container or in an integral method step, in particular by means of at least one multifunctional collection container with a regulatable filling level coupled to the cells. This extends the functionality and also provides an advantageous design construction. The invention furthermore relates to a corresponding electrolysis device and to a corresponding multifunctional collection container.

11 Claims, 3 Drawing Sheets

(56) References Cited

U.S. PATENT DOCUMENTS

| | | |
|---|---|---|
| 8,137,513 B2 | 3/2012 | Kato |
| 8,308,917 B2 * | 11/2012 | Hinatsu ............... C25B 1/00 205/628 |
| 2002/0153244 A1 | 10/2002 | Speranza |
| 2008/0257740 A1 | 10/2008 | Helmke |
| 2010/0230295 A1 | 9/2010 | Taruya |
| 2011/0180417 A1 | 7/2011 | Steimke |
| 2012/0222955 A1 | 9/2012 | Takeuchi |
| 2014/0367272 A1 | 12/2014 | Haywood |
| 2017/0037522 A1 | 2/2017 | Kaczur |
| 2017/0247800 A1 | 8/2017 | Lacroix |
| 2018/0127885 A1 | 5/2018 | Krause et al. |
| 2019/0145012 A1 * | 5/2019 | Murayama ............... C25B 9/19 205/628 |

FOREIGN PATENT DOCUMENTS

| | | |
|---|---|---|
| JP | 2014072119 A | 4/2014 |
| JP | 2016204698 A | 12/2016 |
| JP | 2017002344 A | 1/2017 |
| JP | 2017203218 A | 11/2017 |
| KR | 101135707 B1 | 4/2012 |
| KR | 101158118 B | 6/2012 |
| WO | 2016068842 A | 5/2016 |

* cited by examiner

METHOD AND DEVICE FOR PROVIDING AT LEAST ONE PRODUCT STREAM BY ELECTROLYSIS AND USE

CROSS REFERENCE TO RELATED APPLICATIONS

This application is a U.S. National Stage Entry of International Patent Application Serial Number PCT/EP2019/063722, filed May 28, 2019, which claims priority to German Patent Application No. DE 10 2018 208 624.9, filed May 30, 2018, the entire contents of both of which are incorporated herein by reference.

FIELD

The present disclosure generally relates to a device and a method for providing at least one product stream.

BACKGROUND

An electrolysis plant conventionally consists of an electrolyzer, a combined electrolyte system and a gas system. The electrolyzer comprises a multiplicity of electrochemical cells, which are combined in one or more frameworks. In the respective framework, the cells are suspended in a frame of the framework, for example in the manner of a hanging file folder, so that the cells can be removed upward for maintenance or repair (construction height of a building hall at least two times as great as the height of the cell). For example, about three to five frameworks are provided, each of which may be fed individually or together.

The outflow of electrolyte from all the cells, or from all the frameworks, is preferably combined in a single collection line (the so-called header). To this end, preferably one, but optionally a plurality of (free-level) outflow lines (so-called outflow headers) are provided in the immediate vicinity of the electrolyzer (conventionally below or laterally next to the electrolyzer) on each electrode side (anode and cathode). There, the two-phase mixture produced during the electrolysis in order to obtain gas (in the case of water electrolysis, in particular the anolyte and oxygen or the catholyte and hydrogen, respectively) is collected from the cells and separated. In this case, the term "header" may be understood generally as an external collection line; in contrast to manifolds (collection lines) used inside the cells, headers are arranged outside the cells. A header may combine the outflow from a multiplicity of cells (for example 260 cells), in particular all the cells of one or more frameworks or even of the entire plant. The gas phase is discharged upward, while the liquid phase, or the electrolyte (anolyte and catholyte), are conveyed downward into the so-called anolyte or catholyte container, respectively, in order to collect the electrolyte. These are therefore used as emptying containers for the electrolyte conveyed out from the cell and as a kind of buffer for a pump system for creating an electrolyte circuit.

It should be mentioned that an electrolyte plant may optionally be operated in a combined operating mode (in particular "cross operation"), in which case the anolyte and catholyte sides may be operated together in combination. Optionally, the operating mode may also be a separate operating mode (in particular "parallel operation"), each side being operated individually and separately from the other side.

In order to ensure a free outflow from the cells, the electrolyzer and the outflow lines must be installed above the anolyte and catholyte containers. This entails a minimum required construction height of the electrolysis plant, which in many cases, depending on the installation site, must exceed the maximum permissible or maximum desired construction height, which then leads to significant construction and equipment costs. There has therefore long been an interest in an electrolysis plant that is as compact as possible with good functionality.

Previously known electrolysis devices and electrolysis methods are described, for example, in the following publications: U.S. Pat. Nos. 6,338,786 B1, 8,137,513 B2, EP 2 905 359 A1.

Thus, a need exists for an electrolysis plant (device), in particular for the electrochemical production of hydrogen by water electrolysis, as well as a method having the features described in the introduction, so that the electrolysis, or the plant technology required therefor, may be optimized further, particularly also in a cost-efficient and space-saving configuration and/or in terms of operational reliability. The object may also generally be regarded as being to provide an attractive overall method and plant concept for electrolysis, which is preferably also compatible with as many previously used electrolysis process types as possible.

DETAILED DESCRIPTION

Figure 1:
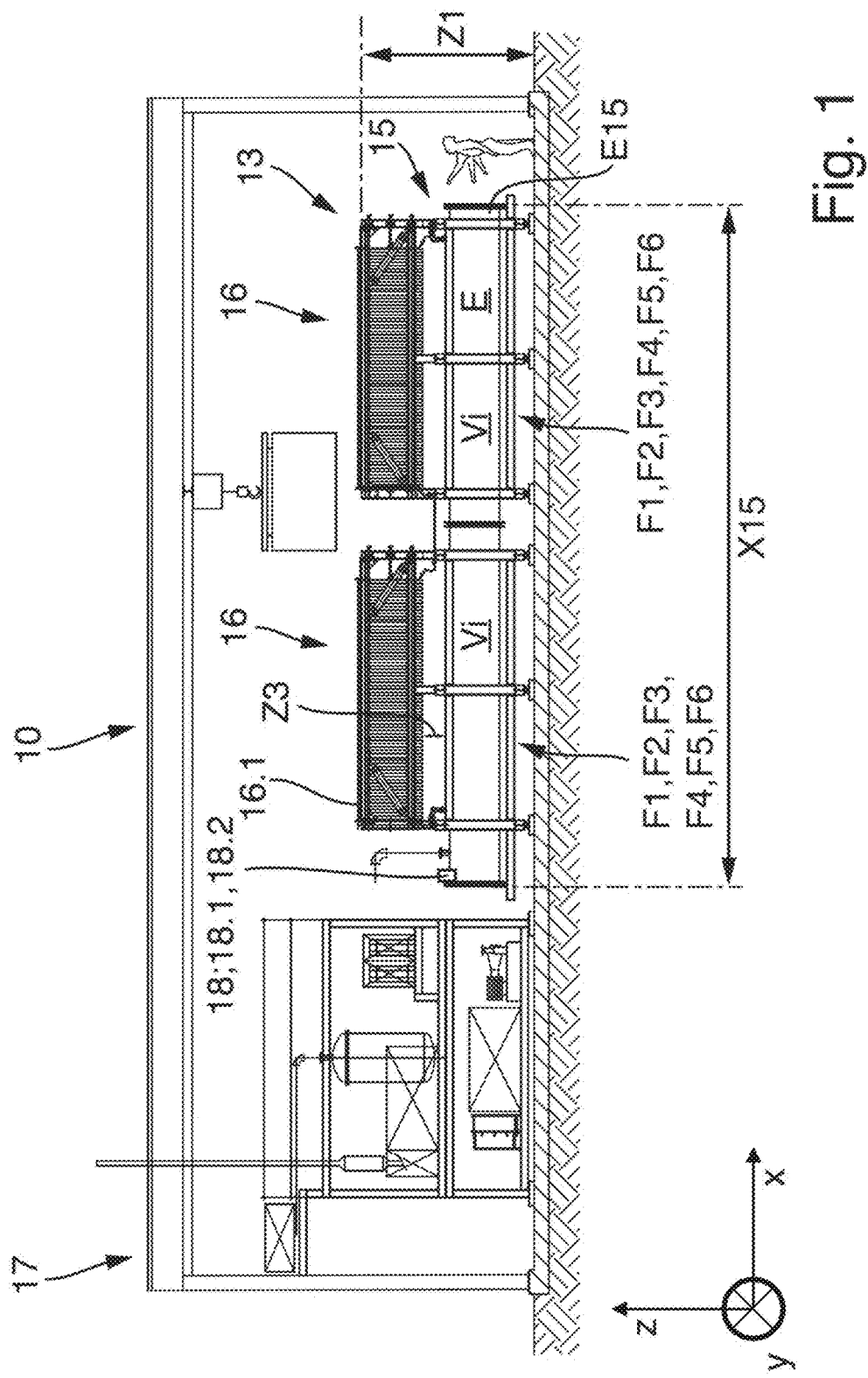
FIG. 1 is a schematic side view of an electrolysis device according to one exemplary embodiment.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a device and a method for providing at least one product stream, in particular hydrogen, by electrolysis by means of an electrolyzer. The invention furthermore relates not least to the use of at least one multifunctional collection container in an electrolysis device as well as to method steps which can be carried out owing to the multifunctional collection container.

A solution to the problem described in the prior art includes an electrolysis device adapted for providing at least one product stream, in particular hydrogen, in particular by water electrolysis, in particular adapted for providing the product stream according to a method described in more detail below, having: an electrolyzer comprising a multiplicity of electrolysis cells, combined to form at least one framework, for providing electrolyte, or a two-phase mixture, by electrolysis, the electrolyzer having an anolyte side and a catholyte side; wherein the electrolysis device is adapted for discharging the electrolyte (or the two-phase mixture) from the cells (first function) and for phase separation of the electrolyte (or the two-phase mixture) into two phases (further, in particular second function), in particular respectively at the respective side of the electrolyzer, and wherein the electrolysis device is furthermore adapted for collecting, or temporarily storing, the electrolyte (further, in particular third function) upstream of a pump system for the electrolysis device, in particular a pump system adapted for circulating the electrolyte; wherein the electrolysis device comprises at least one multifunctional collection container which can be/is coupled to the cells and is thereby adapted for integrally providing at least two functions integrated into the multifunctional collection container, namely discharge (first function) and collection or temporary storage (further, in particular third function), respectively by means of the multifunctional collection container, in particular at the respective side of the electrolyzer. In this way, various device advantages may be achieved in relation to the electrolysis device and also in relation to components coupled thereto. Process advantages and variation possibilities are furthermore obtained. For example, gas extractions from an anolyte or catholyte container, respectively, may be entirely obviated. The multifunctional collection container may in this case be adapted and arranged, or interconnected or provided with piping, for the buffered pump supply.

It has been found that the arrangement according to the invention is not restricted to the "single cell" design, but may also be applied to the other conventional design concepts of electrolysis devices. There also need not be any restriction to water electrolysis, for example, since the arrangement according to the invention also provides the herein described advantages in the electrolysis of any other substances.

The structure dictated by the individual functions, or the design concept, may be broken down according to the invention by the functional integration, in particular also with the advantage that the plant may be configured or designed more flexibly and may be optimized, for example also in terms of construction height. In particular, the following advantages of the arrangement according to the invention may be mentioned: cost reduction in terms of equipment, pipes, steelwork construction; smaller plant size; reduced construction height; shorter construction time; reduced risk in terms of flooding the multifunctional collection container; increased operational reliability; reduced outlay in terms of instrumentation and process management. For example, it is possible to save on several meters of construction height, also for a building hall containing the device. By a separate collection container being avoided, the construction height may be reduced significantly even if the volume of the multifunctional collection container is relatively large and the multifunctional collection container is arranged below the cells.

The multifunctional collection container may also, in particular, be referred to as a multifunctional outflow header MFH with an integrated functional scope. The multifunctional collection container may, in particular, also be referred to as a free-level collection container, in particular a free-level collection flow container. The term "free-level" in this case hitherto conventionally refers to a line which is not fully filled, and which is for example only half-filled. Outflow headers hitherto conventionally configured as free-level lines have a multiplicity of feeds for electrolyte (corresponding to the outflows of the multiplicity of electrolysis cells) and furthermore at least one outlet for the liquid phase and one outlet for the gas phase. The term "free-level" may in this case be understood as an indication of the method option of being able to draw off a gas phase from a line separately from a liquid phase. The MFH according to the invention need not necessarily have a different construction than previously known containers, although the MFH according to the invention may be characterized by the integration according to the invention into the plant concept according to the invention and by the design according to the invention for the multiplicity of functions (in particular up to six functions).

An electrolyzer is in this case preferably to be understood as a device adapted for electrolysis. In what follows, an electrolyte is preferably to be understood as any type of fluid at an arbitrary method instant and in an arbitrary phase composition in an electrolysis device, whether at the (method) instant of discharge from the cells or at the (method) instant of recycling through a pump system. By definition, the term electrolyte also covers two-phase mixtures of anolyte/catholyte and gas, and also conceptually includes the gas phase. According to the present definition, the term electrolyte therefore covers in particular any type of fluids or two-phase mixtures produced during the electrolysis, and in particular foam.

A cell is in this case preferably to be understood as a unit of the electrolyzer, in which the electrolysis can be performed, in particular independently of other neighboring cells. A plurality of cells may be combined to form a framework of, for example, 100 cells.

A pump system is in this case preferably to be understood as a system adapted for circulating the electrolyte, whether in relation to the anolyte and/or in relation to the catholyte.

"Integral" is in this case preferably to be understood as integration or merging of a multiplicity of functions and/or plant components and/or method steps.

Water electrolysis will be described by way of example below, specifically by reference to the anode side (anolyte, or oxygen). This description applies similarly for the cathode side (catholyte, or hydrogen).

According to the prior art, the function of the anolyte outflow headers (outflow lines) is separated from the function of the anolyte container. The respective anolyte outflow header is in this case used for combining the anolyte two-phase mixture (in particular comprising oxygen) from the individual components (in particular cells) of the electrolyzer. The anolyte container, on the other hand, is used as a buffered pump supply or temporary store for anolyte.

According to the present invention, the functions of a classical anolyte outflow header and of a classical anolyte container are combined by technical device and method combination of these equipment items to form a common integrated anolyte header tank (multifunctional collection container, or multifunctional outflow header MFH). According to the invention, the anolyte container hitherto conventional according to the prior art may be replaced; a separate anolyte container may be superfluous. According to the invention, the volume of the hitherto conventional anolyte outflow header may be increased. The two-phase mixture of anolyte and oxygen from all the cells may be collected in the multifunctional header tank (MFH) thereby provided. In addition, the function of a buffered pump supply and of an intermediate store for the anolyte circuit may optionally also be provided by means of the MFH. In this case, the operating volume and the filling level for the MFH may also be selected, or adjusted, to be large enough that sufficiently full phase separation (gas and liquid phases) may be ensured by a correspondingly low flow velocity and a sufficiently large volume may furthermore be provided as a buffered pump supply. Furthermore, the total volume of the MFH may in this case also optionally be selected to be large enough that the individual components, or cells, of the respective framework of the electrolyzer can be fully emptied into the MFH (drain function).

Due to the multifunctional collection container MFH according to the invention, the number of equipment parts required may furthermore be reduced and costs may therefore also be saved. In this case, the total construction height may for example be reduced by about three to four meters. In this way, a direct impact on the total construction height of the cell area may also advantageously be ensured (or indirectly the height of a machine hall, storage hall). This also allows further cost savings, particularly in terms of steelwork construction and pipeline construction.

A multifunctional collection container MFH is in this case preferably to be understood as a container which, in contrast to a line, is adapted for a minimum residence time of the fluid to be collected, a lower threshold value for the minimum residence time being defined in particular by at least temporarily motionless fluid (statically arranged fluid) (tank function), and the minimum residence time being definable in particular by the volume of the collection container. The MFH is adapted for collecting the fluid by reducing the flow rate of the fluid, in particular to the flow rate zero (0) during the minimum residence time.

For the integrated multifunctionality, the MFH may be provided with a relatively large volume. In contrast thereto, a large volume has hitherto not been expedient for the separate function of outflow headers. Likewise, it has not hitherto been possible to envision functional integration, in particular not in the case of chloralkali mixtures, since reductions in terms of the buffer volume of the anolyte container would therefore have had to be tolerated.

It has been found that the function integration may be carried out, in particular for water electrolysis, in connection with an efficient and attractive method and plant concept. The term cycle process may genuinely be used in the case of water electrolysis. Relatively small filling level variations occur, particularly in contrast to production processes for chloralkali mixtures. It has been found that, particularly in the case of water electrolysis, all of the electrolyte (fluid) which is delivered from the respective anolyte or catholyte header tank (MFH) may also be recycled in its entirety back into the corresponding header tank.

By the possibility of coupling the MFH selectively to a particular number of cells or frameworks (for example one anolyte MFH for two frameworks with 100 cells each), the term modular construction of the electrolysis device may be used, in which case the MFH may ensure cross-modular function integration. The MFH may in this case be designed in particular as a function of the cells to be coupled, for example volume-dependently, and for example with a view to a preferred range for the filling level in the MFH.

According to the invention, it has been found that by function integration into the MFH and adapted design of the MFH, the following functions in particular may be provided, or ensured, integrally together by means of a single method component (multifunctional method stage), the respective function in this case relating to a multiplicity of cells, in particular to all the cells of at least one framework: discharging electrolyte from the cells (first function); phase separation (second function); collection (third function); buffering the electrolyte, in particular also in terms of volume variations due to phase changes or foaming (fourth function); making available or providing the electrolyte for a pump circuit or for the circulation inside the plant (fifth function); emptying (draining) a multiplicity of cells, in particular for the purpose of maintenance or replacement (sixth function). The order selected here of the functions has no importance; since all the functions are carried out integrally, this order relates neither to a process hierarchy or to a sequence of method steps.

Depending on the plant concept, the MFH may be a container which does not come under the provisions for pressure vessels. In other words: the electrolysis plant may optionally be operated at pressures in the range of at most a few hundred millibars [mbar] so that the MFH does not need to be designed as a pressure vessel.

According to the invention, all the functions, in particular at least the functions of discharge, collection, buffering, phase separation, may be integrated fully into the MFH without further containers or plant components having to be provided for these functions. Depending on the plant concept, the functions of buffered pump supply and draining may also be fully provided integrally by the MFH. In the latter configuration, a separate collection/emptying tank may in particular be obviated. Hitherto conventionally provided separate collection/emptying tanks have hitherto been used only rarely, at most a few times per year, and take up a relatively large amount of space/room, and furthermore also entail significant additional costs.

According to one exemplary embodiment, the electrolysis device is furthermore adapted for also integrally providing the function, integrated into the MFH, of phase separation (further, in particular second function) by means of the MFH, in particular at the respective side. In this way, method flexibility may also be achieved.

According to the invention, the MFH is furthermore adapted for integrally providing the function of buffering the electrolyte during a predefinable minimum residence time (in particular also in terms of volume variations due to phase changes or foaming) and the function of temporarily storing the electrolyte with a predefinable minimum volume or minimum filling level in order to make a minimum volume available as a buffered pump supply. This also allows a streamlined design construction and expedient method interconnection.

According to one exemplary embodiment, the electrolysis device is furthermore adapted for also integrally providing the function, integrated into the MFH, of emptying the cells (draining) by means of the MFH, in particular for maintenance purposes. In this way, it is possible to save on space requirement and device outlay.

According to one exemplary embodiment, the MFH can be/is coupled to the pump system. This also allows expedient method interconnection.

According to one exemplary embodiment, the (respective) MFH is arranged below the electrolyzer, in particular respectively at the respective side. Besides technical plant advantages, this also provides a compact construction. Gravity-driven discharge, or forwarding, of the electrolyte may thereby be facilitated. The discharge and forwarding of the electrolyte may be carried out in a "freely running fashion".

According to one exemplary embodiment, the (respective) MFH is arranged at least approximately centrally in relation to the electrolyzer. The also allows a compact arrangement. A central, in particular slightly offset, arrangement of, in particular, two MFHs in this case also provides advantages in terms of saving on construction space and fittings.

According to one exemplary embodiment, the (respective) MFH is arranged at a height position independently of the conventional height position of an anolyte or catholyte container, in particular respectively at the respective side. The function integration allows decoupling of further components. A separate collection container is no longer required and therefore the MFH also does not necessarily need be arranged higher than an anolyte or catholyte container or a drain tank. This also leads to greater design freedom.

According to one exemplary embodiment, the (respective) MFH is arranged at a lower height position relative to the cells, in particular at the respective side. This also provides a purely gravitational force-driven flow, at least in terms of some of the functions.

According to one exemplary embodiment, the (respective) MFH is connected by a pipe on its rear side to the further plant components of the system. This also allows integration which is technically advantageous for the device, particularly in terms of the relative orientation or positioning of the MFH.

According to one exemplary embodiment, the (respective) MFH has a volume of at least 15% of the total volume of the electrolysis half-cells, particularly in relation to a cell or framework volume of all (half-)cells coupled to the MFH in the range of from 10 to 60 cubic meters [$m^3$] in total volume. According to one exemplary embodiment, the MFH has a percentage volume in relation to the volume of the (half-)cells coupled to the MFH in the range of from 30 to 150 percent. This respectively provides technical process flexibility and may extend the functionality. It also provides a good buffering capability.

According to one exemplary embodiment, the (respective) MFH has a length/width ratio in the range of from 10 to 75. This furthermore not least has design advantages and also promotes the function integration.

According to one exemplary embodiment, the (respective) MFH has a cylindrical geometry or a geometry for providing an at least partially cylindrical buffer volume for the electrolyte. Besides technical plant advantages (in particular construction space), this also allows optimization in terms of material transport and optimization of the relative arrangement of the components with respect to one another.

According to one exemplary embodiment, the (respective) MFH has a diameter in the range of from 450 to 1000 mm, particularly in the range of from 500 to 800 mm.

According to one exemplary embodiment, the (respective) MFH has a maximum diameter in the range of from 800 to 1000 mm, in particular with a cylindrical cross-sectional geometry. This also respectively allows advantageous technical plant integration. A relatively large diameter of the MFH according to the invention also allows a long residence time, so that the phase separation can be promoted (comprehensive functional integration of the phase separation).

According to one exemplary embodiment, the (respective) MFH has a length defined as a function of the number of cells, particularly in the range of from 10 to 15 m (meters) for 150 cells, or in the range of from 20 to 30 m (meters) for up to 300 cells. Length definition as a function of the number of cells allows expedient design and function integration and may also not least provide a considerable free path length for electrolyte, which offers process advantages.

According to one exemplary embodiment, the (respective) MFH has an electrolyte filling level of at least 100 mm, particularly in relation to a cell or framework volume in the range of from 10 to 60 $m^3$ (cubic meters). This may also ensure high technical method flexibility, particularly in terms of a time overlap of a plurality of functions, or in terms of filling level variations.

According to one exemplary embodiment, the (respective) MFH is adapted or designed for flow velocities of the electrolyte of up to a maximum of 0.2 m/s. This also allows particularly comprehensive function integration.

The length of the MFH may in this case also be adjusted, or selected, as a function of the number of single elements. It has been found that an additional length of about 2 m may be advantageous in terms of instrumentation and fittings. The length which is expedient depending on the application may be selected from a wide range, for example between 5 and 30 m.

According to one exemplary embodiment, the MFH comprises at least one integrated measuring sensor unit, in particular at least one filling level sensor for electrolyte and/or at least one temperature sensor. In this way, the respective process may be regulated more easily. Depending on the process stage, monitoring of the MFH may provide important information in a straightforward way.

Filling level monitoring and regulation in combination with a volume that is as large as possible provides the possibility of also using the MFH in a simple and operationally reliable way as a buffered pump supply. Furthermore, nitrogen introduction and safety instruments (so-called XV and level switches) may be provided. It has been found that comprehensive function integration is possible in a straightforward way by using filling level regulation. In contrast thereto, filling level regulation has not hitherto been carried out in conventionally used outflow lines (merely unregulated free outflow).

According to one exemplary embodiment, the MFH comprises at least one static flow path obstacle, in particular a barrier, in the region of the electrolyte to be received or of the buffer volume provided for the electrolyte. In this way, it is possible to influence the flow path, or the flow speed. For example, plates or baffles are arranged in a lower half of the MFH. The flow path obstacle may also be described as an installed part for optimizing phase separation processes.

According to one exemplary embodiment, the (respective) MFH is adapted for a residence time of the electrolyte (or of the two-phase mixture, or of the two phases) in the range of from 2 to 5 minutes. In this way, in particular, the function of phase separation may also be integrated in an effective way.

According to one exemplary embodiment, the (respective) MFH is adapted for a flow velocity of the electrolyte (or of the two-phase mixture, or of the two phases) in the range of from 0.01 to 0.2 m/s (meters per second). This also allows effective phase separation integrated in the MFH.

According to one exemplary embodiment, the MFH is adapted for a minimum residence time of the electrolyte (or two-phase mixture) to be collected, in particular adapted for collecting the electrolyte (or the two-phase mixture) by reducing its flow rate, in particular to the flow rate zero, during the minimum residence time. In this way, comprehensive function integration may also be ensured.

According to one exemplary embodiment, the electrolysis device comprises two MFHs which can be/are coupled to the cells, namely at the respective side of the electrolyzer for anolyte and catholyte, the MFHs being arranged in particular laterally offset with respect to one another, in particular at least approximately centrally in relation to the electrolyzer. This arrangement provides technical device and method advantages with maximally comprehensive function integration.

According to one exemplary embodiment, the electrolysis device comprises two MFHs which can be/are coupled to the cells, which are connected to one another by means of an equilibrating line and/or which are coupled to one another by means of filling level-dependent flow regulation and/or bypass flow regulation (regulated bypass). This also provides flexibility in terms of different operating modes of the electrolysis device (in particular "cross operation" or "parallel operation").

The aforementioned object is also achieved according to the invention by an electrolysis device comprising an MFH with an integral combination of at least the function of electrolyte discharge and the function of electrolyte collection and the functions of buffering and buffered pump supply, from a group of functions including at least: discharge, phase separation, collection or temporary storage, buffering, providing the electrolyte for or to a pump system, emptying cells, in particular an electrolysis device as described above; wherein the electrolysis device is connected to the pump system, in such a way that, by means of the MFH, the function of buffered pump supply can be integrally provided exclusively by means of the MFH (in terms of electrolyte), in particular with a buffer volume of at least 10 or 20 or 30% of the total volume of the electrolyte. This leads to advantages as mentioned above. The MFH may in this case be referred to as a free-level collection header, and configured and arranged accordingly. The percentage specification may in this case refer in particular to the volume of the electrolyte inside the electrolysis cells. Independently of the functions to be carried out or independently of the operating state, such a buffer volume also makes it possible to compensate for the displacement of the gas phase into the electrolysis cells. For particular plant configurations, buffer volumes in the range of only 5% may also be sufficient. For maximum flexibility during the operation of the plant, it has been found that a relatively large buffer volume of, for example, 30% is advantageous.

The aforementioned object is also achieved according to the invention by an MFH for an electrolysis device, in particular for an electrolysis device as described above, wherein the MFH is adapted for integrally providing a plurality of functions from the following group, including at least the first, third, fourth and fifth functions:
 first function: discharging electrolyte from cells of the electrolysis device;
 second function: phase separation;
 third function: collecting the electrolyte from the cells;
 fourth function: buffering the electrolyte, particularly in respect of phase changes during the electrolysis;
 fifth function: making the electrolyte available for a pump circuit of the electrolysis device;
 sixth function: receiving electrolyte for the purpose of fully emptying the cells.

This leads to advantages as mentioned above.

The aforementioned object is also achieved according to the invention by a method for providing at least one product stream, in particular hydrogen, by electrolysis, in particular by water electrolysis, by means of an electrolyzer having a multiplicity of electrolysis cells, combined to form at least one framework, for providing electrolyte, or a two-phase mixture, by electrolysis; wherein the electrolyte is discharged from the cells (first function) and separated into two phases (further, in particular second function), and wherein the electrolyte, or the two-phase mixture, or the phases, is or are collected, or temporarily stored, upstream of a pump system, in particular a pump system for circulating the electrolyte (further, in particular third function); wherein at least the functions of discharging the electrolyte, or the two-phase mixture, and collecting, or temporarily storing, the electrolyte, or the two-phase mixture, or the two phases, are carried out integrally together in an MFH or in an integral method step, in particular by means of at least one MFH with a regulated filling level which can be/is coupled to the cells. This leads to advantages as mentioned above.

According to one embodiment, the function of phase separation is also carried out integrally together with the functions of discharge and collection in the integral MFH and/or in an integral method step, in particular by means of a MFH with a regulated filling level also used as a buffered pump supply. In this way, a large scope of the possible function integrations may be used.

According to one embodiment, pumping of the electrolyte by means of the pump system (particularly in circulation), in particular recycling to the cells, takes place downstream of the collection, or temporary storage, the electrolyte being provided for the pumping by means of the integral MFH or by the integral method step (MFH with buffered pump supply function). This provides comprehensive functional integration, or merging.

According to the invention, the collection also comprises the following two subfunctions: buffering the electrolyte during a predefinable minimum residence time, in particular for phase separation, and temporarily storing the electrolyte with a predefinable minimum volume or minimum filling level in order to make a minimum volume available as a buffered pump supply. This provides a wide functionality in an integral method step, or by means of a multifunctional collection container. This wide functionality also has, in particular, advantages with a view to the volume changes due to foaming.

According to one embodiment, a residence time for the phase separation of the electrolyte (or of the two-phase mixture, or of the two phases) in the range of from 2 to 50 minutes is complied with, particularly in the MFH.

According to one embodiment, for the phase separation, a flow velocity of the electrolyte (or of the two-phase mixture, or of the two phases) in the range of from 0.01 to 0.2 meters per second [m/s] is complied with, particularly in the MFH. In this way, the function integration may respectively also be extended.

According to one embodiment, the collection comprises buffering of the electrolyte with a view to volume variations in the range of from 5 to 30 percent of the total volume of electrolyte. According to one embodiment, the collection comprises making a minimum volume of electrolyte available as a buffered pump supply for an internal pump circuit. This may respectively extend the function integration.

According to one embodiment, hydrogen is provided by water electrolysis, in particular by means of an electrolysis device in the power range of from 5 to 20 MW. It has been found that the method according to the invention, or the device according to the invention, can provide significant advantages for water electrolysis, particularly in the aforementioned power range. The performance (or the production capacity) of the electrolysis device may also be expressed by reference to a volume flow [normal cubic meters per hour]. The electrolysis device preferably has a capacity in the range of from 1000 to 4500 Nm3/h [$Nm^3/h$] (hydrogen production rate).

According to one embodiment, all of the electrolyte which is delivered from the (respective) MFH is recycled in its entirety back into the corresponding MFH (full recycling). In this mode of operation, the MFH may be used as a component of the circuit.

According to one embodiment, the functionally integral method is carried out in a separate or combined operating mode, particularly in a combined operating mode with an equilibrating line (and/or a line with a comparable function for regulated volume compensation) between an MFH on the anolyte side and an MFH on the catholyte side. This may further increase the flexibility.

As mentioned, a plurality of MFHs may be connected to one another, in particular an MFH for anolyte connected to an MFH for catholyte. Volume variations, which may occur for example in the case of volume flows that are not exactly equal, may be compensated for by the aforementioned equilibrating line (communicating pipes) and/or respectively by a pump bypass of the two electrolyte pumps, so that a partial flow from a first MFH may be conveyed from the pump output side back to the pump intake side. The effective volume flow may thereby be reduced. The corresponding pump bypass may be opened in the event of an increasing filling level in the first MFH. If the filling level in the second MFH increases, on the other hand, the other (second) bypass may be opened. In this operating mode, the filling level measurement data of at least two filling level sensors in at least two MFHs may thus be analyzed and used as a basis for control/regulation.

The aforementioned object is also achieved according to the invention by a use of at least one MFH in an electrolysis device for providing an integral function combination of at least the function of electrolyte discharge (outflow) and the function of electrolyte collection as well as the functions of buffering and providing the electrolyte for or to a pump system, from a group of functions including at least: discharge/outflow, buffering, phase separation, collection or temporary storage, providing the electrolyte for or to a pump system, in particular for circulating the electrolyte, receiving electrolyte for the purpose of fully emptying the cells, particularly in an electrolysis device as described above, in which case phase separation is preferably also carried out in the MFH, particularly in a method as described above. The MFH may in this case be arranged and adapted for buffered pump supply, in particular with a buffer volume of at least 10 or 20 or 30% of the total volume of the electrolyte.

The aforementioned object is also achieved according to the invention by a method for providing at least one product stream, in particular hydrogen, by electrolysis by means of an electrolyzer having a multiplicity of electrolysis cells combined to form at least one framework; wherein electrolyte is discharged from the cells and separated into two phases, and wherein the electrolyte is collected upstream of a pump system, particularly in a method as described above; wherein at least one further function comprising emptying the cells is integrally provided or carried out together with the function of discharge in an MFH, in particular by means of at least one MFH with a regulatable filling level coupled to the cells, in particular for maintenance of the electrolyzer, and also the function of collection integrally together with the functions of discharge and emptying. This provides the advantages mentioned above. In particular, it is possible to save on a separate drain tank. In the case of a plurality of frameworks, the already provided capacity of the MFH may expediently also be used for the drain function.

For more comprehensive explanation of the present invention, a water electrolysis module, particularly of the 5 MW class, will be described in particular below. In this case, the term "header" is used synonymously with the term "MFH" and is abbreviated to "MFH", unless otherwise indicated.

The aforementioned object is also achieved according to the invention by a method as described above, wherein filling level regulation is performed by carrying out a filling level measurement in the respective MFH and comparing the current ACTUAL filling level with a SETPOINT filling level or with a lower and/or upper threshold value for the filling level, in particular for the purpose of supplying or discharging medium in order to adjust a filling level in a desired/predefined filling level range. The filling level regulation in this case preferably comprises a filling level measurement of the anolyte MFH or catholyte MFH, respectively. The volume (amount of electrolyte) inside the respective MFH and the total volume (amount of electrolyte) in the electrolysis device are determined by means of the filling level. For example, the supply of water (in particular demineralized water) may also be regulated as a function of the total volume. By means of the respective measured (ACTUAL) filling levels, volume variations between the two MFHs may in this case also be regulated or avoided by means of a compensating line (equilibrating line), in particular without switching or valve actuations being necessary.

An exemplary plant configuration will be described below.

A water electrolysis module (electrolysis device), in particular of the 5 MW class, is used to obtain hydrogen and oxygen by water electrolysis in potassium hydroxide. The module consists of a cell area having an electrolyzer and an electrolyte system, transformer/rectifier, and hydrogen treatment and oxygen treatment, supplemented by a cooling water system.

Demineralized water is fed into the process in the electrolyte system and is electrochemically split into hydrogen and oxygen in the cells of the electrolyzer. The hydrogen formed is subsequently cooled and filtered in the hydrogen treatment, and sent to an internal battery limit. The oxygen produced is likewise cooled and filtered in the oxygen treatment.

The electrical current load of the electrolyzer or the hydrogen production rate may be used as a reference variable of the water electrolysis. The volume flow of demineralized water is dependent on the production rate of the water electrolysis and may be regulated by means of the electrical current load. In this case, the total volume of the electrolyte system may be measured by means of two filling level measurements and used as a control variable for fine regulation. The hydrogen as a reference product component may be regulated to an overpressure of a few hundred millibars [mbar g]. The oxygen pressure follows this regulation with a differential pressure of a few millibars. The hydrogen leaves the internal battery limit for hydrogen compression with an overpressure. The electrolyte is conveyed in the circuit with a constant volume flow by means of a plurality of pumps. Since a concentration shift within the electrolyte takes place in the cells because of the electrochemical reaction, the volume flows of anolyte and catholyte are different. This difference may optionally be compensated for by an equilibrating line, which equilibrating line couples two MFHs to one another.

The individual cells of the electrolyzer may for example be arranged in a bipolar fashion, i.e. in series, and to this end may be suspended in a steel frame and pressed together in order to ensure the electrical contact. Each cell consists, in particular, of an anode and cathode half-shell made of nickel, a separator and a sealing system, which seals the anode and cathode half-shells from one another and externally seals the cell. The anode and cathode half-shells of the cell are in this case separated from one another in an electrically insulating and ionically conductive fashion by the separator. The inflow and outflow headers of the anode and cathode half-shells are, in particular, respectively located laterally with respect to or below the cells.

For charge equilibration, positively charged potassium ions migrate from the anode side of the cell through the separator to the cathode side. In this case, water molecules are also transported to the cathode side. The two-phase mixture of oxygen and anolyte which is formed on the anode side of the cells is, in particular, discharged downward through a connected corrugated pipe and collected from the cells, or from all the cells, in a multifunctional anolyte header tank (MFH) of the electrolyzer. The separation from the anolyte of the oxygen that has been formed may take place in the free-level volume of the MFH with an integrated buffered supply function. The oxygen may be conveyed upward to an oxygen cooler, while the oxygen-saturated anolyte may be fed back to the electrolyte circuit by means of the anolyte pump. The MFH may in this case fulfill the function of a buffered pump supply.

A two-phase mixture of catholyte and hydrogen is in turn formed on the cathode side of the cells, and may be discharged in a similar way to the anolyte to a multifunctional catholyte header tank (MFH), in particular through a corrugated pipe. There, the hydrogen may be separated from the catholyte. The hydrogen may be conveyed upward to the hydrogen cooler. The hydrogen-saturated catholyte may be fed to the electrolyte circuit by means of the catholyte pump. The corresponding MFH may in this case fulfill the function of a buffered pump supply.

A constant differential pressure between the cathode and anode spaces is advantageous for reliable operation of the cells. The hydrogen pressure may, in particular, be adjusted to be a few millibars higher than the oxygen pressure.

Mode of operation: anolyte and catholyte from the cells may, in particular, be conveyed in a common crossover electrolyte system. Anolyte from the anode half-shells of the electrolyzer may be collected in the anolyte MFH. From there, the anolyte may be pumped by means of an anolyte pump to the catholyte inflow header of the electrolyzer. Since water is constantly consumed during the water electrolysis, demineralized water may be fed in on the intake side of the anolyte pump. The amount of the feed may be regulated by means of the electric current load of the electrolyzer and the filling level of the electrolyte. Similarly, catholyte may be collected from cathode half-shells in the catholyte MFH. From there, the catholyte may be conveyed through the catholyte pump for thermal regulation by means of the catholyte cooler to the anolyte inflow header of the electrolyzer.

For optimized operation, the cells of the electrolyzer may be operated at a specified temperature, which may be adjusted as a function of the electric current load of the electrolyzer. In normal operation, the electrolyte system may be cooled in a temperature-regulated fashion by means of a catholyte cooler. In order to empty the electrolyte system (for example for maintenance purposes), the electrolyte may be received in the anolyte and catholyte MFHs (optional drain function).

The oxygen from the anolyte MFH may be cooled with cooling water in the oxygen cooler. The alkaline compensate thereby formed may be fed to the electrolyte system. After the cooling, the oxygen may be filtered in an oxygen filter, particularly in order to remove any alkaline aerosols, and may be released through the roof (upward). In order to avoid clogging of the oxygen filter by hydroxides, the filter may be washed with demineralized water. The condensate from the oxygen filter may likewise be recycled.

The hydrogen from the catholyte MFH may be cooled with cooling water in the hydrogen cooler and subsequently recooled in the hydrogen recooler with a water/glycol mixture from the $CO_2$ evaporation of the methanol synthesis. The alkaline condensate formed during the cooling may be fed to the electrolyte system. The hydrogen may subsequently be filtered in a hydrogen filter, particularly in order to remove entrained alkaline aerosols, and may subsequently be conveyed to the methanol synthesis. In order to avoid clogging of the hydrogen filter by hydroxides, the filter may be washed with demineralized water. If necessary, the hydrogen may be released through a hydrogen flue. The flue is preferably provided with flashback safety, which can prevent the flame from entering the gas system in the event of hydrogen ignition in the flue.

For combined supply of the catholyte cooler, oxygen cooler and hydrogen cooler, cooling water may be circulated by means of a cooling water heat exchanger and cooled against air. In this case, the coolers may be regulated by means of the respective process temperature. The hydrogen recooler may be cooled by means of a separate water/glycol circuit from the methanol synthesis.

For more comprehensive explanation of the present invention, a further water electrolysis module will be described in particular below.

A further exemplary plant configuration will be described below.

The plant (electrolysis device) described below for obtaining hydrogen by water electrolysis consists of a cell area having an electrolyzer, an associated transformer/rectifier, an electrolyte system consisting of an anolyte system and a catholyte system, as well as hydrogen conditioning and oxygen conditioning. Demineralized water is fed into the process in the two electrolyte systems and is electrochemically split into hydrogen and oxygen in the cells of the electrolyzer. The hydrogen formed is subsequently cooled in the hydrogen conditioning, filtered and released to the atmosphere through a flue. Flanges and shut-offs for analysis, and optionally for further processing of the hydrogen, may likewise be provided. The oxygen produced is cooled in the oxygen conditioning, filtered and likewise released to the atmosphere through a flue.

The electrical current load of the electrolyzer or the production rate of hydrogen may be used as a reference variable of the water electrolysis. The required volume flow of the demineralized water fed in is regulated by means of the electrical current load. The volume flows to the electrolyzer are flow-regulated as a function of the electrical current load or the filling level of the electrolyte containers, depending on the operating mode. The anolyte/catholyte pumps are regulated as a function of the pressure before the electrolyte inflow headers. The oxygen as a reference product component may be regulated to an overpressure of a few hundred millibars. The hydrogen pressure follows this regulation with a differential pressure of a few millibars.

The electrolyzer is used for the production of gaseous hydrogen and oxygen by water electrolysis in sodium hydroxide (optionally: potassium hydroxide). The electrolyzer consists of a plurality of cells which are arranged in a bipolar fashion, i.e. in series, and to this end are for example suspended in a steel frame and pressed together. Each cell consists of an anode and cathode half-shell made of nickel, a cation-selective membrane and a sealing system, which seals the anode and cathode sides from one another and externally seals the cell. The anode and cathode sides are in this case separated from one another in an electrically insulating and ionically conductive fashion by the membrane. The inflow and outflow lines of the anode and cathode sides are respectively located laterally with respect to or below the cells. The anode and cathode inflows contain for example about 10-20 percent by weight of lye, depending on the operating mode. The emerging phase mixtures of anolyte and oxygen and of catholyte and hydrogen are likewise discharged downward into an anolyte or catholyte cell header MFH, respectively.

In the individual elements, or cells, oxygen and water are formed on the anode side by electrochemical oxidation of the hydroxide ions of the lye. Hydrogen and hydroxide ions are formed on the cathode side by electrochemical reduction of the water. In the overall net reaction, one molecule of water is therefore consumed per hydrogen molecule produced. For charge equilibration, positively charged sodium (or potassium) ions migrate from the anode side of the cell through the membrane to the cathode side. In this case, water molecules are also transported through the membrane to the cathode side. The pH in the anolyte thereby decreases and the pH in the catholyte increases. At the same time, the volume flows of the two electrolytes change as a function of the water consumption and the transport processes involved.

The cells of the electrolyzer are supplied with thermally regulated lye from the anolyte and catholyte systems by means of the anode inflow and cathode inflow headers, depending on the operating mode. The volume flow may in this case be regulated by means of flow meters and flow regulating valves, which turn off the electrolyzer in the event of an insufficient supply. A pressure drop, which may be adjusted in particular by means of relatively long, thin pipes, in this case ensures a uniform distribution of the anode and cathode inflow volume flows to the individual cells.

The two-phase mixture of oxygen and alkaline anolyte which is formed on the anode side of the cells is discharged downward through a connected corrugated pipe and collected from all the cells in the anolyte cell header MFH of the electrolyzer. The separation from the anolyte of the oxygen that has been formed may take place in this free-level collection container. The oxygen is conveyed upward to the oxygen cooling (gas outlet), while the oxygen-saturated anolyte flows away downward to the anolyte container (liquid outlet).

A two-phase mixture of catholyte and hydrogen is in turn formed on the cathode side of the cells, and is discharged in a similar way to the anolyte through a corrugated pipe to the catholyte cell header. There, the hydrogen is likewise separated from the catholyte and is conveyed upward to the hydrogen cooler, while the hydrogen-saturated catholyte flows away to the catholyte container MFH and is collected there.

A constant positive differential pressure between the cathode and anode spaces is advantageous for reliable operation of the cells. The hydrogen pressure is preferably adjusted to be a few millibars higher than the oxygen pressure. If the oxygen pressure, hydrogen pressure or the differential pressure exceed or fall below corresponding limits, safety mechanisms may be activated (in particular locks, overpressure regulations at the electrolyzer), which may ensure compliance with the maximum permissible operating pressures. Examples which may be mentioned are: turning off the electrolyzer, reducing the load of the electrolyzer, safeguarding the electrolyzer against an excessively high/low differential pressure, pressure safeguarding of the anolyte and catholyte cell headers of the electrolyzer, safeguarding against flow of hydrogen and oxygen back to the nitrogen system, overpressure safeguarding of the hydrogen system, underpressure safeguarding of the hydrogen system, and/or pressure safeguarding of nitrogen with respect to the cell area.

The catholyte from the catholyte cell header of the cells flows into the catholyte container. The anolyte from the anolyte cell header of the cells flows into the anolyte container. In order to be able to empty the electrolyzer after shutting down, the MFHs may optionally be dimensioned accordingly in order to be able to receive the entire amount of liquid of the system if required. According to the invention, it has been found that the MFHs already have a considerable volume anyway because of the function integration, and additional integration of the drain function does not lead to a particularly high extra outlay. From the MFH or MFHs, anolyte and catholyte are pumped in a pressure-regulated fashion by means of the anolyte/catholyte pumps for temperature regulation via the anolyte heat exchanger or the catholyte heat exchanger, respectively, to the electrolyzer. The anolyte/catholyte pumps preferably have a common standby pump. From the heat exchangers, the electrolytes may be sent in an interlaced circuit ("cross operation") or alternatively in two mutually separated anolyte and catholyte circuits ("parallel operation") to the inflow headers of the electrolyzer. In cross operation, the anolyte is conveyed from the anolyte container through the anolyte pump via the anolyte heat exchanger as a cathode inflow to the cathode inflow header of the electrolyzer. Correspondingly, the catholyte is conveyed from the catholyte container through the catholyte pump via the catholyte heat exchanger as an anode inflow to the anode inflow header of the electrolyzer. In parallel operation, the anolyte is pumped from the anolyte container through the anolyte pump via the anolyte heat exchanger as an anode inflow to the anode inflow header of the electrolyzer. Similarly, the catholyte is conveyed from the catholyte container through the catholyte pump via the catholyte heat exchanger as a cathode inflow to the cathode inflow header of the electrolyzer. Since accumulation of lye in the catholyte system and depletion of lye in the anolyte system may occur in parallel operation, an anolyte container and a catholyte container are connected to one another in order to allow liquid compensation. In this case, separation of hydrogen and oxygen on the gas side may be ensured. Since water is continuously consumed during the water electrolysis, demineralized water may be replenished on the intake side of the anolyte/catholyte pumps in both operating modes.

By means of a flow regulator, on the one hand the feeding of demineralized water as a function of the electrical current load and on the other hand the volume flow of the anode and cathode inflows of the electrolyzer may be kept as constant as possible. In this case, the anolyte and catholyte containers MFH are used to compensate for variations in the volume of the respective electrolyte due, for example, to feeding of water or recycling of electrolyte and condensate (integrated buffer function). The volume flow of anolyte and catholyte to the electrolyzer is primarily dictated by the electrical current load of the electrolyzer, or by the volume flows required for filling or circulation of the electrolyzer. The pressure in the anode and cathode inflow headers may, in particular, be regulated by means of the frequency of the anolyte/catholyte pumps in order to ensure constant pressure conditions in the inflows. Pressure transmitters provided therefor may be arranged behind the anolyte/catholyte heat exchangers. In the case of a spontaneous pressure drop, an interlock that starts a standby pump may be activated.

In cross operation, the cathode inflow from the anolyte system to the cathode inflow header of the electrolyzer is preferably flow-regulated as a function of the electrical current load of the electrolyzer. The flow regulation provided therefor is located before the cathode inflow header.

Filling level regulation of the catholyte collection container MFH may in this case define the volume flow of the anode inflow. The flow regulation is arranged before the anode inflow header. In parallel operation, both the anode inflow to the anode inflow header and the cathode inflow are flow-regulated as a function of the electrical current load. Overfilling protection, or pump protection, is carried out by filling level meters that act on the anolyte/catholyte pumps.

The feeding of demineralized water is dictated by the consumption in the water electrolysis and is therefore regulated by means of the electrical current load of the electrolyzer. The feeding primarily takes place in the cathode inflow. In cross operation, demineralized water is replenished in a flow-regulated fashion via the intake side of the anolyte pump, and in parallel operation via the intake side of the catholyte pump.

For optimized operation, the cells of the electrolyzer may be run at a specified temperature, which may be adjusted as a function of the mode of operation and the electrical current load of the electrolyzer. In order to start up the plant and at low load, heating of the electrolyte system takes place by means of heat exchangers. In normal operation, the electrolyte system is cooled by means of these heat exchangers. The heat exchangers respectively have temperature regulation, the temperature sensors of which are respectively located downstream of the heat exchanger. The temperature setpoint values are dictated by the operating window of the electrolyzer. The heat exchangers are protected by overpressure valves against damage by thermal expansion. Examples of safety mechanisms which may be mentioned are: overfill safeguarding of the containers, dry running protection of the pumps, operation and autostart of the pumps, restart of the pumps after electrical outage, and/or overheating protection of the anolyte and catholyte circuits.

The oxygen from the anolyte cell header MFH is combined in the oxygen conditioning and cooled with cooling water in the oxygen cooler. The slightly alkaline condensate thereby formed flows away to the MFH. After the cooling, the oxygen is filtered in the oxygen filter, particularly in order to remove entrained alkaline aerosols, and released through the oxygen flue. In order to avoid clogging of the oxygen filter by hydroxides, the filter is regularly washed with demineralized water. Examples of safety mechanisms which may be mentioned are: safeguarding against return flow of oxygen, inerting the oxygen flue, and/or safeguarding against oxygen overpressure.

The hydrogen from the catholyte cell header MFH is combined in the hydrogen conditioning and cooled with cooling water in the hydrogen cooler. The slightly alkaline condensate thereby formed is recycled to the MFH. After the cooling, the hydrogen is filtered in the hydrogen filter, particularly in order to remove entrained alkaline aerosols, and released through the hydrogen flue. In order to avoid clogging of the hydrogen filter by hydroxides, the filter is regularly washed with demineralized water. Examples of safety mechanisms which may be mentioned are: safeguarding against return flow of hydrogen, inerting the hydrogen flue, flame extinguishing by means of steam, and/or safeguarding against overpressure.

Figure 2:
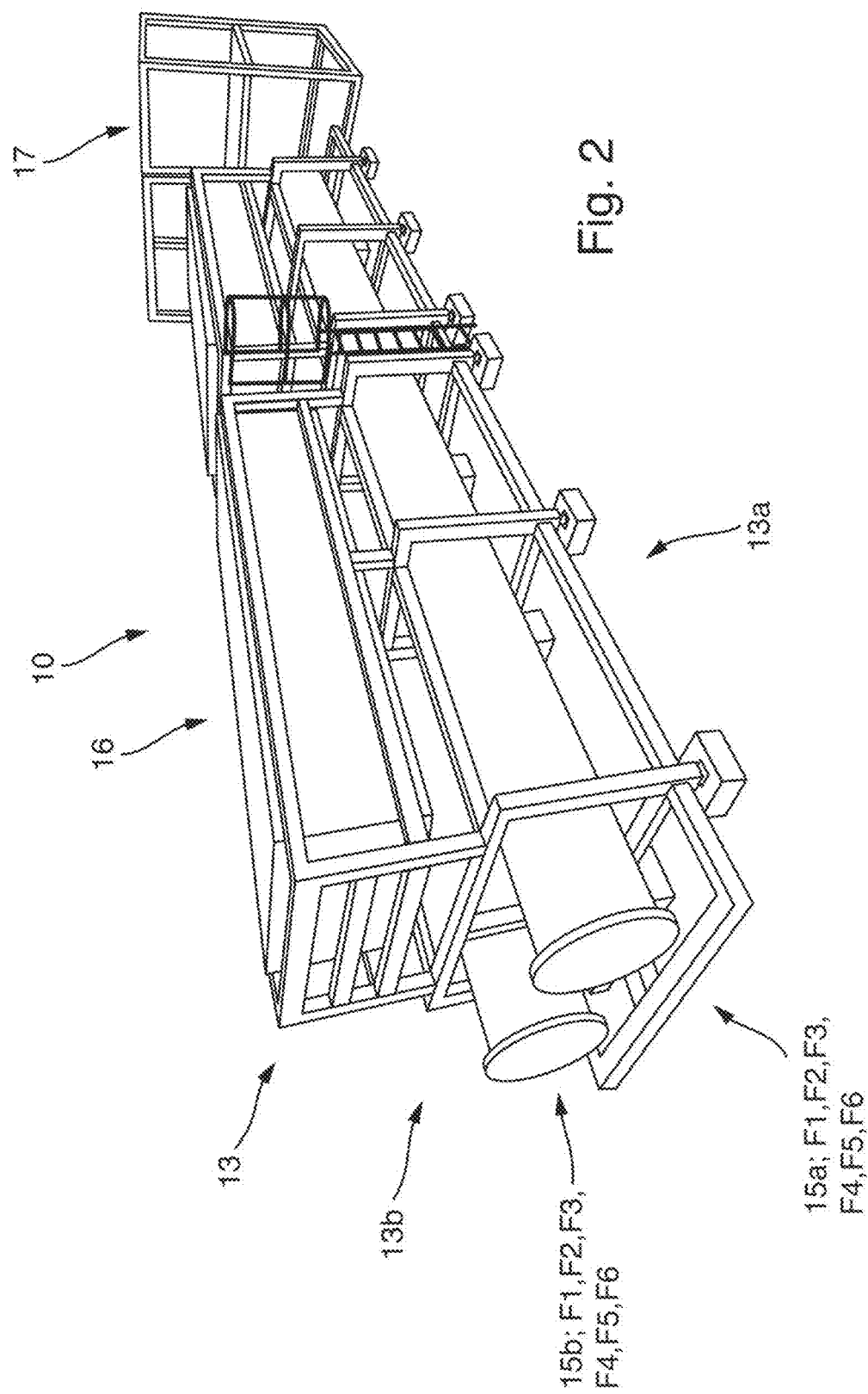
FIG. 2 is a schematic perspective view of an electrolysis device according to one exemplary embodiment.

FIGS. 1 and 2 show an electrolysis device 10 having an electrolyzer 13 and a multifunctional collection container MFH 15 (respectively for anolyte, catholyte). The construction of the electrolysis device 10 may respectively be comparable for the anolyte side 13a and the catholyte side 13b, particularly in a symmetrical arrangement. To this end, one MFH 15a may be provided for the anolyte side and one MFH 13b may be provided for the catholyte side. These MFHs on either side may optionally also communicate with one another by means of an equilibrating line (not represented), in particular for so-called cross operation. The electrolysis device 10 furthermore comprises at least one framework 16 having a multiplicity of cells 16.1.

By means of a pump system 17 and an electrolyte circuit internal to the plant, electrolyte E may be conveyed through the electrolysis device 10. A measuring sensor unit or electrolyte analytics 18 comprise, in particular, at least one filling level sensor 18.1 and at least one temperature sensor 18.2, in which case the measuring sensor unit may be at least partially arranged in the respective MFH.

By using the respective MFH, a multiplicity of functions may be undertaken by means of simple plant technology, or by means of only one technical plant component, in particular cumulatively together, with an advantageous design construction. It has been found that the MFH according to the invention can allow functional integration of at least six functions:

first function F1: discharging electrolyte from the cells;
second function F2: phase separation;
third function F3: collection;
fourth function F4: buffering the electrolyte;
fifth function F5: making the electrolyte available for a pump circuit (buffered pump supply);
sixth function F6: emptying (draining) at least the cells, in particular for maintenance purposes.

By means of the respective MFH 15, a significant collection or buffer volume Vi may furthermore be provided, particularly in such a way that the total space requirement of the plant remains relatively moderate. According to FIG. 1, the MFH 15 extends in the longitudinal direction x and thereby provides a considerable free path length x15 in the internal volume Vi of the MFH, in particular a free path length x15 greater than the longitudinal extent of the cells, or of the framework 16. In other words: a respective MFH may simultaneously serve a plurality of frameworks, or be coupled to a plurality of frameworks, which may likewise reduce the apparatus outlay. The MFH in this case also provides a large buffer volume for the greatest possible process flexibility. The electrolyte filling level in the internal volume Vi is denoted here by E15 in order to describe the optional sixth function F6 (draining).

In the height direction z, a relatively low construction height z1 of the entire electrolysis plant may be ensured, particularly with a minimized vertical distance z3 between the MFH and the cells 16.1.

Figure 3:
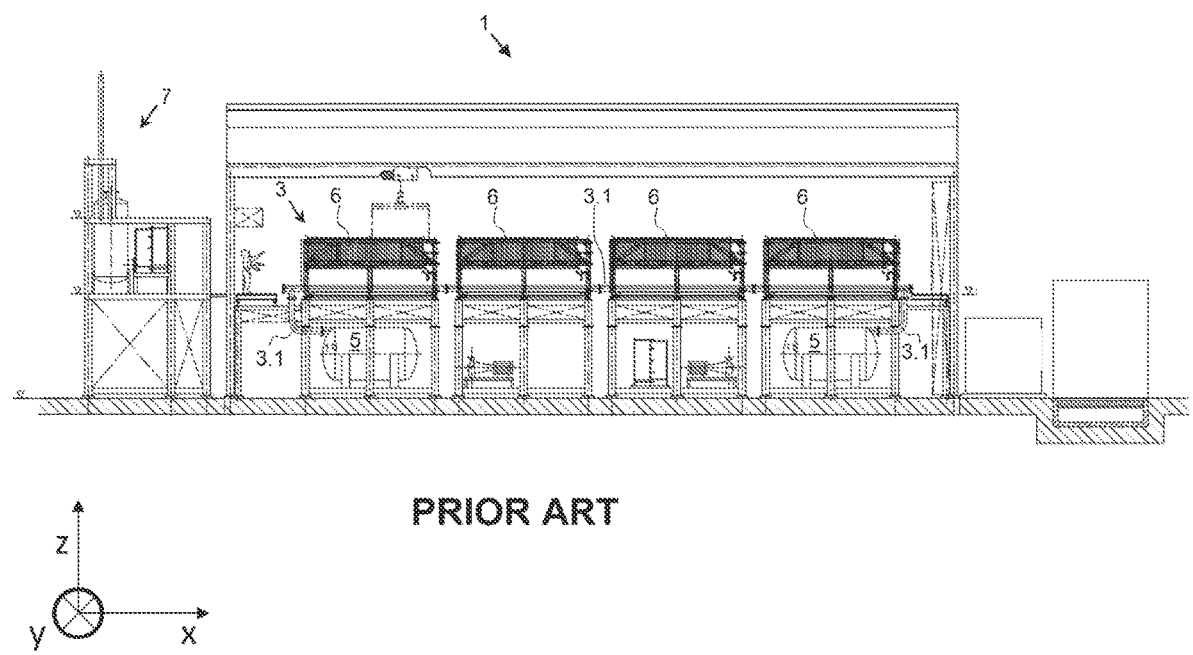
FIG. 3 is a schematic side view of an electrolysis plant according to the prior art.

FIG. 3 describes an electrolysis plant 1 according to the prior art. An electrolyzer 3 and a multiplicity of frameworks 6, each having a multiplicity of cells, are arranged on a construction/mounting plane above anolyte or catholyte containers 5. The frameworks 6 are coupled to the containers 5 via one or more (free-level) outflow lines 3.1 (outflow headers) respectively for anolyte, catholyte. Circulation of electrolyte may be carried out by means of an electrolyte system 7 having a pump system and an electrolyte circuit.

The electrolysis plant 1 according to the prior art has a very large height. This also has (cost) disadvantages, for example due to the need for large heights of mounting/ machine halls. Relatively large technical device (apparatus) outlay is furthermore necessary.

LIST OF REFERENCES 1 electrolysis plant according to the prior art
3 electrolyzer according to the prior art
3.1 (free-level) outflow line or outflow header (respectively for anolyte, catholyte)
5 anolyte or catholyte container according to the prior art
6 framework comprising cells
7 electrolyte system with pump system and electrolyte circuit
10 electrolysis device
13 electrolyzer
13a anolyte side
13b catholyte side
15 multifunctional outflow header "MFH" (in particular respectively for anolyte, catholyte)
15a MFH for anolyte side
15b MFH for catholyte side
16 framework
16.1 cell
17 electrolyte system or pump system, and electrolyte circuit internal to plant
18 measuring sensor unit or electrolyte analytics
18.1 filling level sensor
18.2 temperature sensor
E electrolyte
E15 electrolyte filling level in MFH
F1 first function, in particular discharging electrolyte from the cells
F2 second function, in particular phase separation
F3 third function, in particular collection
F4 fourth function, in particular buffering the electrolyte
F5 fifth function, in particular making the electrolyte available for a pump circuit (buffered pump supply)
F6 sixth function, in particular emptying (draining), in particular for maintenance
Vi collection or buffer volume
x longitudinal direction
x15 length, or free path length, in the internal volume of the MFH
z height direction
z1 construction height of the entire electrolysis plant
z3 vertical distance between electrolyzer or cell and outflow to the MFH

What is claimed is:

1. A method for providing at least one product stream by electrolysis, comprising:
providing an electrolyzer having a multiplicity of electrolysis cells combined to form at least one framework, the electrolyzer configured to discharge electrolyte from the cells and separate the electrolyte into two phases, wherein the electrolyte is collected upstream of a pump system,
carrying out at least the functions of discharge, collection, and phase separation integrally together in a multifunctional outflow header with a regulatable filling level, the collection comprising the following two functions:
buffering the electrolyte during a predefined minimum residence time, and
storing, temporarily, the electrolyte with a predefined minimum volume or minimum filling level to make a minimum volume available as a buffered pump supply.

2. The method of claim 1 wherein pumping of the electrolyte by means of a pump system takes place downstream of the collection, the electrolyte being provided for the pumping by means of the integral multifunctional outflow header, and/or wherein all of the electrolyte which is delivered from the multifunctional outflow header is recycled in its entirety back into the multifunctional outflow header.

3. The method of claim 1 comprising providing hydrogen by water electrolysis.

4. A method for providing at least one product stream by electrolysis by means of an electrolyzer having a multiplicity of electrolysis cells combined to form at least one framework, comprising:
discharging electrolyte from the cells,
separating the electrolyte into two phases,
collecting the electrolyte upstream of a pump system, and emptying the cells,
wherein the discharging, separating, collecting, and emptying steps are performed integrally together in a multifunctional outflow header with a regulatable filling level that is coupled to the cells,
wherein a volume of the multifunctional outflow header is large enough so that the cells can be completely emptied into the multifunctional outflow header for maintenance of the electrolyzer.

5. An electrolysis device adapted to provide at least one product stream by water electrolysis according to the method of claim 1, comprising:
the electrolyze comprising the multiplicity of electrolysis cells combined to form the at least one framework, the electrolyzer having an anolyte side and a catholyte side;
wherein the electrolysis device is configured to discharge electrolyte from the cells and to separate the electrolyte into two phases
wherein the electrolysis device is furthermore configured to collect the electrolyte upstream of the pump system;
wherein the electrolysis device comprises:
at least one multifunctional outflow header that is configured to couple to the cells and is configured to integrally provide at least the following functions integrated into the multifunctional outflow header, comprising:
discharge and collection respectively by means of the multifunctional outflow header,
buffering the electrolyte during a predefinable minimum residence time,
temporarily storing the electrolyte with a predefinable minimum volume or minimum filling level in order to make a minimum volume available as a buffered pump supply, and
phase separation.

6. The electrolysis device of claim 5 wherein the electrolysis device is furthermore configured to integrally provide the function, integrated into the multifunctional outflow header, of emptying the cells by means of the multifunctional outflow header.

7. The electrolysis device of claim 5 wherein the multifunctional outflow header is configured to be coupled to the pump system; and/or wherein the multifunctional outflow header is arranged below the electrolyzer and/or wherein the multifunctional outflow header is arranged at least approximately centrally in relation to the electrolyzer; and/or wherein the multifunctional outflow header is arranged at a lower height position relative to the cells.

8. The electrolysis device of claim 5 wherein the multifunctional outflow header comprises at least one integrated measuring sensor unit.

9. The electrolysis device of claim 5 wherein the electrolysis device comprises two multifunctional outflow headers that are configured to be coupled to the cells, wherein the multifunctional outflow headers are arranged laterally offset with respect to one another, at least approximately centrally in relation to the electrolyzer.

10. The electrolysis device of claim 5 wherein the electrolysis device comprises two multifunctional outflow headers that are configured to be coupled to the cells, which are connected to one another by means of an equilibrating line and/or which are coupled to one another by means of filling level-dependent flow regulation and/or bypass regulation.

11. An electrolysis device, comprising
a multifunctional outflow header with an integral combination of at least the function of electrolyte discharge and the function of electrolyte collection and the functions of buffering and buffered pump supply, from a group of functions including at least: discharge, phase separation, collection, buffering, providing the electrolyte for or to a pump system, emptying cells,
wherein the electrolysis device is connected to the pump system such that by means of the multifunctional outflow header, the function of buffered pump supply can be integrally provided exclusively by means of the multifunctional outflow header.

* * * * *